US005099826A

United States Patent [19]

Hayakawa

[11] Patent Number: 5,099,826

[45] Date of Patent: Mar. 31, 1992

[54] VIBRATING DEVICE

[75] Inventor: Katsumi Hayakawa, Nagoya, Japan

[73] Assignee: Teranishi Electric Works, Ltd., Aichi, Japan

[21] Appl. No.: 567,200

[22] Filed: Aug. 13, 1990

[30] Foreign Application Priority Data

Aug. 17, 1989 [JP] Japan ................................ 1-211770

[51] Int. Cl.[5] .......................... A61H 1/00; H02K 7/00

[52] U.S. Cl. .......................................... 128/36; 128/64; 310/40 R; 310/66

[58] Field of Search ....................... 128/32, 33, 34, 35, 128/36, 44, 64; 310/40 R, 66

[56] References Cited

U.S. PATENT DOCUMENTS 3,550,587 12/1970 Kawada ................................ 128/33
3,710,784 1/1973 Taylor ............................. 128/32 X

FOREIGN PATENT DOCUMENTS 871321 6/1961 United Kingdom .
900704 7/1962 United Kingdom .

*Primary Examiner*—Edgar S. Burr
*Assistant Examiner*—Moshe I. Cohen
*Attorney, Agent, or Firm*—Tarolli, Sundheim & Covell

[57] ABSTRACT

The invention provides an improved vibrating device or electromassager including a vibrating plate rocking corresponding to rotation of a crank shaft interlocking with a motor, and a counter weight for compensating for reaction against rocking of the vibrating plate. In the vibrating device thus constructed, the center of gravity of the vibrating plate and that of the counter weight are disposed on the same plane perpendicular to the crank shaft. Accordingly no foce is applied to shake the vibrating plate in the direction of the crank shaft. The vibrating plate is thus rocked stably and noiselessly without making the body of the vibrating device bounce.

12 Claims, 3 Drawing Sheets

VIBRATING DEVICE

BACKGROUND OF THE INVENTION

The present invention relates to an improved vibrating device or electromassager.

In a general vibrating device, a motor driven rotates a crank shaft connected to an output shaft of the motor and thereby rocks a vibrating plate attached to an end of the crank shaft. The general vibrating device includes the vibrating plate and a counter weight for compensating for the reaction against rocking by the vibrating plate; for example, such a vibrating device is disclosed in Japanese Published Utility Model Application No. Sho-51-21592.

The general vibrating device, however, still has a problem. When the vibrating plate is rocked, undesirable shaking occurs in the direction of the crank shaft. For example, when a general vibrating device is used on the floor, the vertical movement of the vibrating plate makes the vibrating device bounce and thus makes a noise.

SUMMARY OF THE INVENTION

The objective of the invention is to provide an improved vibrating device or electromassager in which a vibrating plate is rocked stably and noiselessly without making the entire vibrating device bounce.

The above and other related objectives are realized by a vibrating device including a vibrating plate rocking corresponding to rotation of a crank shaft connected to a motor, and a counter weight for compensating for the reaction against rocking of the vibrating plate, in which the centers of gravity of the vibrating plate and the counter weight are disposed on the same plane perpendicular to the crank shaft.

The driving point of the vibrating plate may also be disposed on the same plane described above. It is further preferable that part of the vibrating plate slopes towards the motor, so that the center of gravity of the vibrating plate shifts to the motor. A protrusion or protrusions may be further provided on the ridge of the slope on the vibrating plate.

In the vibrating device thus constructed, the vibrating plate rocks corresponding to the rotation of the crank shaft interlocking with the motor. The counter weight connected to the crank shaft is balanced with a force applied vertically on the crank shaft due to rocking of the vibrating plate; namely the counter weight compensates for the reaction in the rocking direction. The center of gravity of the counter weight and that of the vibrating plate are disposed on the same plane perpendicular to the crank shaft. When forces of the vibrating plate and of the counter weight are vertically applied onto the crank shaft, the respective points of action for the forces are placed on the same plane. Accordingly no force is applied to shake the vibrating plate in the direction of the crank shaft. In the vibrating device of the invention, the vibrating plate is thus rocked stably and noiselessly without making the entire vibrating device bounce.

When the driving point of the vibrating plate is disposed on the same plane described above, no distortion due to the inertia force of the vibrating plate occurs and the vibrating plate is thus much more stably rocked. When part of the vibrating plate slopes to the motor, the center of gravity of the vibrating plate shifts to the motor and the vibrating plate is thereby well balanced. A protrusion or protrusions provided on the ridge of the slope on the vibrating plate fit and massage a lesion like the plantar arch of a foot effectively.

BRIEF DESCRIPTION OF THE DRAWINGS

The invention may be best understood by referring to the following detailed description of a preferred embodiment and the accompanying drawings, wherein like numerals denote like elements and in which.

DETAILED DESCRIPTION OF PREFERRED EMBODIMENT

Figure 1:
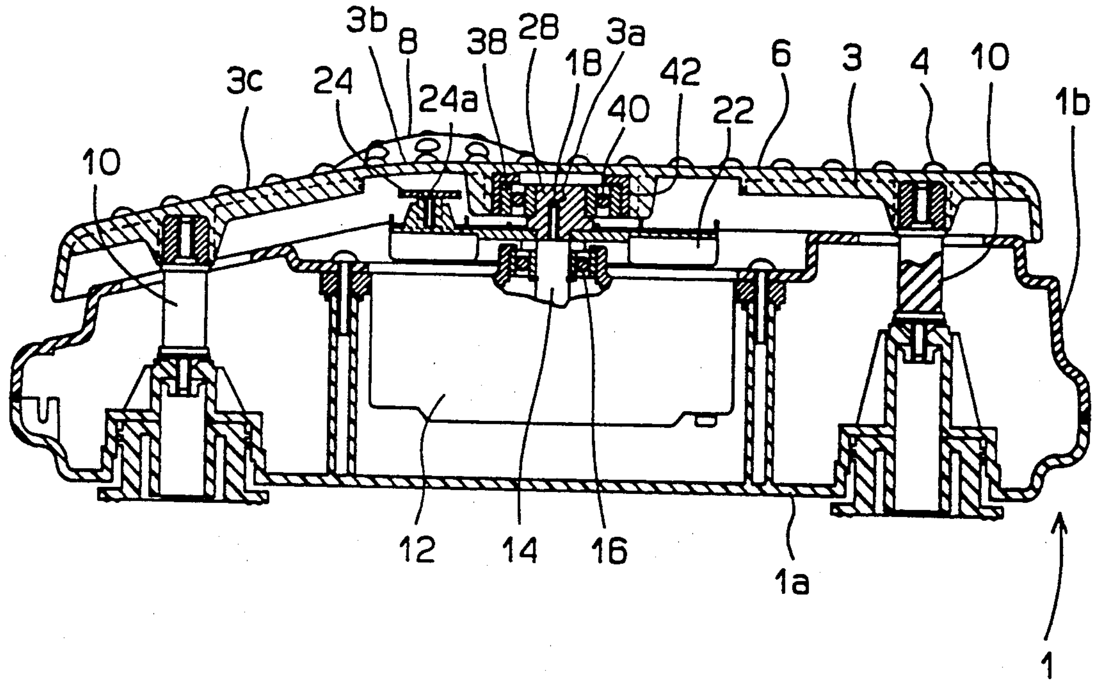
FIG. 1 is a cross sectional view of a vibrating device embodying the present invention.
Figure 2:
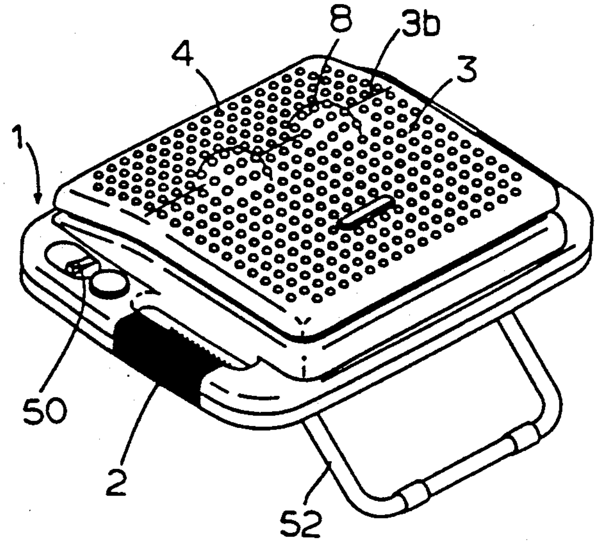
FIG. 2 is a perspective view illustrating the vibrating device of FIG. 1.

A preferred embodiment of the invention is now explained in detail referring to the drawings. FIG. 1 is a cross sectional view illustrating a vibrating device embodying the invention, and FIG. 2 is a perspective view illustrating the vibrating device.

Since there may be many modifications without departing from the scope of the invention, the embodiment below is not intended to limit the invention to the embodiment but is intended to illustrate the invention more clearly.

Figure 4:
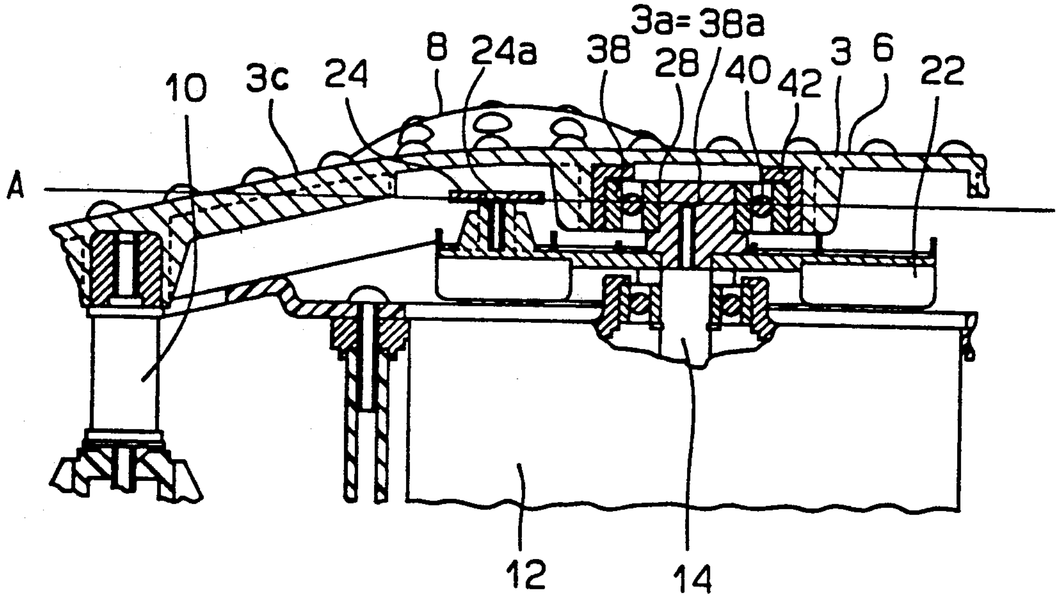
FIG. 4 is an enlarged cross sectional view illustrating the vibrating mechanism of the vibrating device.

A rectangular case 1 consists of a body 1*a* and a cover 1*b* and has a handle 2 integrally formed thereon. A vibrating plate 3 composed of a synthetic resin is provided in such a position that the center of gravity 3*a* is located on a plane A between the vibrating plate 3 and the case 1 as shown in FIG. 4. In the embodiment, the vibrating plate 3 has a slope 3*c* on one end so as to shift the center of gravity 3*a* to the plane A. Another method may be applied to position the center of gravity 3*a* on the plane A. For example, the vibrating plate 3 may have a slope on two ends or a detachable weight may be attached to the vibrating plate 3. The plane A is perpendicular to a crank shaft 28 explained below. A surface 6 of the vibrating plate 3 has numerous semi-spherical projections 4. Large protrusions 8 are further formed on the ridge 3*b* of the slope 3*c*.

Resilient columns 10, e.g., composed of rubber, connect the vibrating plate 3 with the case body 1*a*. One edge of the resilient column 10 is fixed to the vibrating plate 3 and the other to the case body 1*a*, thus allowing the vibrating plate 3 to rock stably. In the embodiment, the resilient column 10 is provided at each corner of the vibrating plate 3.

A motor 12 incorporated in the case 1 rocks the vibrating plate 3. The vibrating mechanism of the embodiment, the motor 12 through the vibrating plate 3, is now explained according to FIGS. 3 and 4.

An output shaft 14 of the motor 12 is supported by a bearing 16, and a male screw 18 is provided on one end of the output shaft 14.

A counter weight 24 for compensating for reaction against rocking of the vibrating plate 3 is provided on an edge of a fan 22 for cooling the motor 12. A through hole 26 is formed on the base of the fan 22.

The crank shaft 28 has a cylindrical body 30 and a flange 32 formed on one end of the body 30. A boss 34 for fitting into the hole 26 of the fan 22 is projected from the other end of the flange 32. A screw hole 36 is provided on the boss 34 in such a position that the center thereof deviates a certain amount from the axis of the body 30.

A crank bearing 38 is mounted on the center of the vibrating plate 3 by using an attachment 42. The crank bearing 38 is placed in such a way that the axis of the crank bearing 38 deviates a certain amount from the axis of the bearing 16 and also the center of a ball 40 is disposed on the plane A. Though the center 38*a* of the crank bearing 38 coincides with the center of gravity 3*a* of the vibrating plate 3 in the embodiment, another configuration may be allowed.

Figure 3:
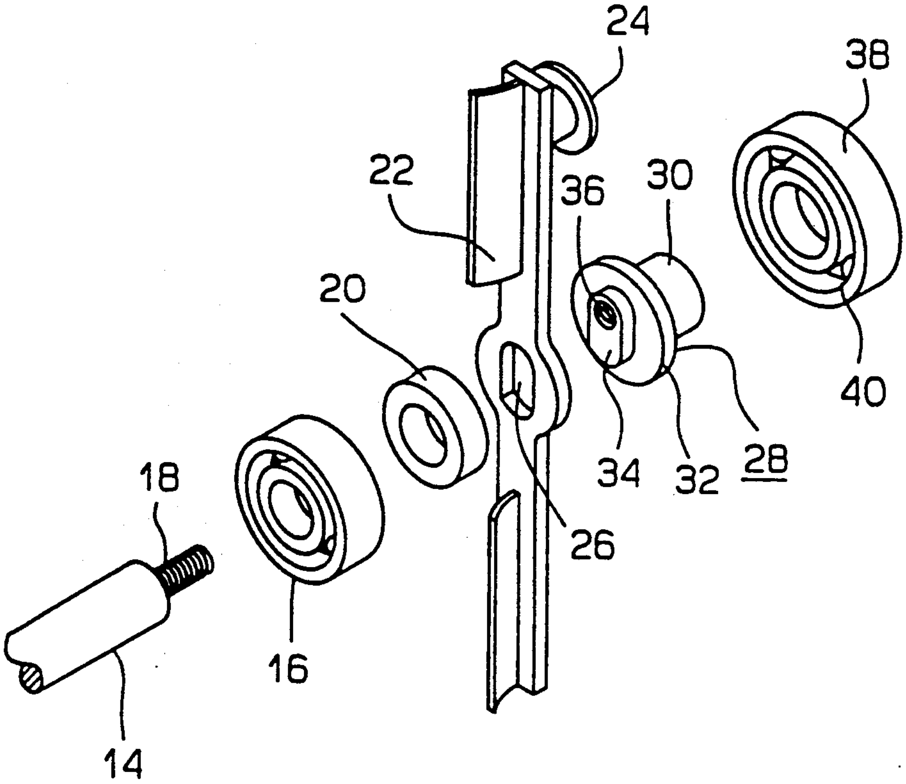
FIG. 3 is an exploded view illustrating a decomposed vibrating mechanism of the vibrating device.

The vibrating mechanism shown in FIG. 3 is assembled as follows. First the output shaft 14 is inserted in the bearing 16 and then into a sleeve 20. The boss 34 is fitted into the through hole 26 of the fan 22, and the male screw 18 of the output shaft 14 is held in the screw hole 36 of the crank shaft 28. The fan 22 is thus pinched between the sleeve 20 and the crank shaft 28. The body 30 of the crank shaft 28 is then fitted into the crank bearing 38.

Figure 5:
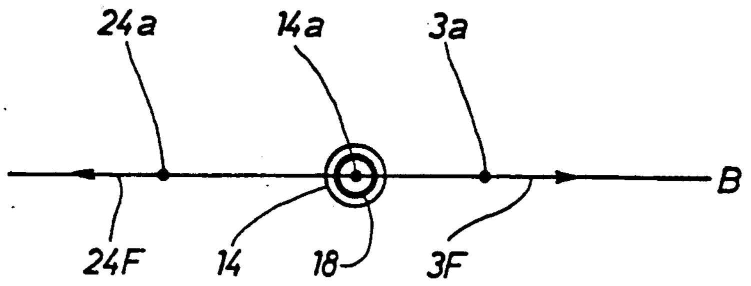
FIG. 5 is a view showing positions of the vibrating plate and the counter weight seen from a direction parallel to the output shaft.

FIG. 5 shows positions of the respective centers of gravity 3*a* and 24*a* of the vibrating plate 3 and of the counter weight 24 seen from a direction parallel to the center line 14*c* of the output shaft 14. A straight line B passing through the centers of gravity 3*a* and 24*a* of the vibrating plate 3 and of the counter weight 24 intersects the center line 14*c* of the output shaft 14. The counter weight 24 is disposed in such a position that the intersection 14*a* is placed between the two centers of gravity 3*a* and 24*a*.

Figure 6:
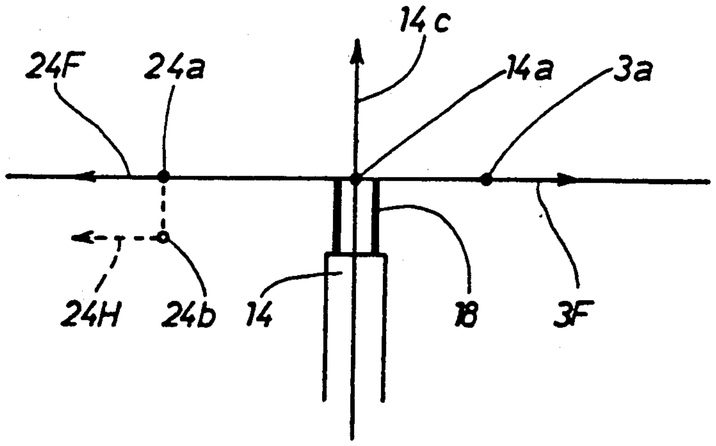
FIG. 6 is a view showing positions of the vibrating plate and the counter weight seen from a direction perpendicular to the output shaft.

FIG. 6 shows positions of the respective centers of gravity 3*a* and 24*a* of the vibrating plate 3 and of the counter weight seen from a direction perpendicular to the output shaft 14. The positions and shapes of the counter weight 24 and of the fan 22 are determined in such a way that the centers of gravity 3*a* and 24*a* of the vibrating plate and of the counter weight 24 are disposed on the same plane A perpendicular to the crank shaft 38.

Though the fan 22 is fixed to the crank shaft 28 by fitting the boss 34 of the crank shaft 28 into the through hole 26 of the fan 22 in the above embodiment, fixation of the fan 22 may be accomplished in any other conventional method. For example, the fan 22 may be fitted into a notch formed on the top of the crank shaft 28. The male screw 18 is mounted on the output shaft 14 in the above embodiment but may be mounted on the crank shaft 28.

The operation of the vibrating device of the embodiment is explained now.

When a switch 50 is turned on to start the motor 12, the crank shaft 28 is driven through the output shaft 14 of the motor 12 to rotate around the center of the screw hole 36. The body 30 of the crank shaft 28 then starts rocking and rotating around the center of the screw hole 36. Since the vibrating plate 3 is supported by the resilient columns 10 and the rotation component of the body 30 is absorbed by the crank bearing 38 holding the body 30 therein, the body 30 transmits only the rocking component to the vibrating plate 3. The body 30 hence starts rocking the vibrating plate 3.

As shown in FIGS. 5 and 6, a force 3F due to rocking of the vibrating plate 3 and a force 24F due to the counter weight 24 are applied in the reverse directions on the output shaft 14; that is, the forces 3F and 24F work to compensate for each other. The counter weight 24 accordingly compensates for reaction against rocking of the vibrating plate 3. The respective centers of gravity 3*a* and 24*a* of the vibrating plate 3 and of the counter weight 24 are disposed on the same plane A perpendicular to the output shaft 14. In rocking of the vibrating plate 3, the point of action for the force 3F due to the vibrating plate 3 thus coincides with that for the force 24F due to the counter weight 24. When the center of gravity of the counter weight 24 is placed at the position of 24*b* like a conventional vibrating device, the point of action for the force 3F does not coincide with that for a force 24H and an undesirable shake occurs in the direction of the output shaft 14. In the vibrating device of the embodiment, however, since a force causing a shake in the direction of the output shaft 14 is not generated, the vibrating plate 3 is stably rocked. The slope 3*c* is formed on the vibrating plate 3 to lower the center of gravity 3*a* to the motor 12. The vibrating device is thus well balanced and gives stable vibration without bouncing itself.

Any desirable lesion of the body is massaged by rocking of the vibrating plate 3. The surface 6 of the vibrating plate 3 perfectly fits a curved lesion such as a foot or the back because of the slope 3*c* and the numerous projections 4 and the protrusions 8 appropriately stimulate the lesion. Since the protrusions 8 are provided on the ridge 3*b* of the slope 3*c*, the vibrating plate 3 fits and massages a lesion like the plantar arch of a foot effectively.

In the vibrating device described above, a leg 52 is further provided for adjusting the height of the vibrating device as shown in FIG. 2. The leg 52 may be detachable or may be held in the bottom of the case body 1*a* when not used.

In the vibrating device of the embodiment, the driving point of a force for rocking the vibrating plate 3 coincides with the center 38*a* of the crank bearing 38 on the plane A as shown in FIG. 4. A force applied on the ball 40 due to rocking of the vibrating plate 3 then acts on the plane A; therefore no distortion due to the inertia force of the vibrating plate 3 occurs. The vibrating plate 3 is accordingly much more stably rocked and the ball 40 has better durability.

Though only one counter weight is used in the embodiment, plural counter weights may be applied. The plural counter weights are disposed in such a way that the resultant of the counter weights becomes equal to the force 24F shown in FIGS. 5 and 6.

In the vibrating device of the invention described above, the center of gravity of the vibrating plate, which is rocked by rotation of the crank shaft, and that of the counter weight, which compensates for reaction against the rocking, are disposed on the same plane perpendicular to the crank shaft. Accordingly no force is applied to shake the vibrating plate in the direction of the crank shaft. The vibrating plate is thus rocked stably and noiselessly without making the whole body bounce.

When the driving point of the vibrating plate is disposed on the same plane, no distortion due to the inertia force of the vibrating plate occurs and the vibrating plate is thus much more stably rocked. When part of the vibrating plate slopes to the motor, the center of gravity of the vibrating plate shifts towards the motor and the vibrating plate is thereby well balanced and is further stably rocked.

A protrusion or protrusions provided on the ridge of the slope on the vibrating plate fit and massage a lesion like the plantar arch of a foot effectively.

What is claimed is:

1. A massager comprising:
- a vibrating plate having its center of gravity lying in a center of gravity plane;
- a rotatable crank shaft connected to the plate for, when rotated, vibrating the plate, the crank shaft having its axis extending perpendicular to the center of gravity plane in which the center of gravity of the plate lies;
- a motor for rotating the crank shaft to vibrate the plate;
- a counter weight for compensating for the reaction force applied on the crank shaft due to rocking of the plate, the counter weight having its center of gravity lying in the same center of gravity plane in which the center of gravity of the plate lies.

2. The vibrating device of claim 1, in which a driving point at which the crank shaft connects to the vibrating plate is also disposed in the center of gravity plane.

3. The vibrating device of claim 1, in which a part of the vibrating plate is bent towards the motor.

4. The vibrating device of claim 1, in which one or more protrusions are provided on a ridge where the vibrating plate is bent towards the motor.

5. The vibrating device of claim 1, in which an axis of an output shaft of the motor is parallel to and different from an axis of the crank shaft.

6. The vibrating device of claim 5, further comprising a fan interposed between the output shaft and the crank shaft.

7. The vibrating device of claim 6, in which the counter weight is mounted on the fan.

8. The vibrating plate of claim 7 in which the axis of the output shaft of the motor intersects the fan on a side of the fan opposite to the side of the fan on which the counter weight is mounted.

9. A vibrating device comprising:
- a motor having a main shaft;
- a fan mounted on the main shaft;
- a crank shaft mounted on the fan such that an axis of the crank shaft is parallel to and different from an axis of the main shaft;
- a vibrating plate mounted on the crank shaft such that the vibrating plate vibrates when the crank shaft rotates; and
- a counter weight mounted on the fan on a side of the fan opposite to the side of the fan on which the main shaft of the motor is located;
- the vibrating plate having its center of gravity lying in a center of gravity plane and the counter weight having its center of gravity lying in the same center of gravity plane in which the center of gravity of the vibrating plate lies, the axis of the crank shaft extending perpendicular to the center of gravity plane.

10. The vibrating device of claim 9, in which a driving point at which the crank shaft connects to the vibrating plate is also disposed in the center of gravity plane.

11. The vibrating device of claim 10, in which a part of the vibrating plate is bent towards the motor.

12. The vibrating device of claim 11, in which one or more protrusions are provided on a ridge where the vibrating plate is bent towards the motor.

* * * * *